United States Patent
Fan et al.

(10) Patent No.: US 10,528,849 B2
(45) Date of Patent: Jan. 7, 2020

(54) LIVENESS DETECTION METHOD, LIVENESS DETECTION SYSTEM, AND LIVENESS DETECTION DEVICE

(71) Applicants: BEIJING KUANGSHI TECHNOLOGY CO., LTD., Beijing (CN); PINHOLE (BEIJING) TECHNOLOGY CO., LTD., Beijing (CN)

(72) Inventors: Haoqiang Fan, Beijing (CN); Kai Jia, Beijing (CN); Qi Yin, Beijing (CN)

(73) Assignees: BEIJING KUANGSHI TECHNOLOGY CO., LTD., Beijing (CN); PINHOLE (BEIJING) TECHNOLOGY CO., LTD., Beijing (CN)

( * ) Notice: Subject to any disclaimer, the term of this patent is extended or adjusted under 35 U.S.C. 154(b) by 26 days.

(21) Appl. No.: 15/007,544

(22) Filed: Jan. 27, 2016

(65) Prior Publication Data

US 2017/0061251 A1    Mar. 2, 2017

(30) Foreign Application Priority Data

Aug. 28, 2015 (CN) .......................... 2015 1 0543516

(51) Int. Cl.
*G06K 9/62* (2006.01)
*G06K 9/00* (2006.01)

(52) U.S. Cl.
CPC ......... *G06K 9/6267* (2013.01); *G06K 9/6256* (2013.01)

(58) Field of Classification Search
CPC .............. G06K 9/6267; G06K 9/6256; G06K 9/00268; G06K 9/0061
See application file for complete search history.

(56) References Cited

U.S. PATENT DOCUMENTS

| | | | |
|---|---|---|---|
| 5,482,048 A | * | 1/1996 | Johnson ............. G06K 9/00268 |
| | | | 382/128 |
| 8,235,529 B1 | | 8/2012 | Raffle et al. |
| | | | (Continued) |

FOREIGN PATENT DOCUMENTS

| | | |
|---|---|---|
| CN | 1426760 | 7/2003 |
| CN | 101159016 | 4/2008 |
| | (Continued) | |

OTHER PUBLICATIONS

Olincy, A., et al. Age diminishes performance on an antisaccade eye movement task. Neurobiology of Aging 18.5 (1997) 483-489. (Year: 1997).*

(Continued)

*Primary Examiner* — Vincent Rudolph
*Assistant Examiner* — Pinalben Patel
(74) *Attorney, Agent, or Firm* — Hamre, Schumann, Mueller & Larson, P.C.

(57) ABSTRACT

The application provides a liveness detection method capable of implementing liveness detection on a human body, and a liveness detection system that employs the liveness detection method. The liveness detection method comprises: obtaining video data acquired via a video acquisition module; determining, based on the video data, a feature signal of an object to be detected; judging whether the feature signal meets a first predetermined condition, and if the feature signal meets the first predetermined condition, identifying that the object to be detected is a living body, wherein the feature signal is indicative of eye movement of the object to be detected.

12 Claims, 8 Drawing Sheets

(56) References Cited

U.S. PATENT DOCUMENTS

| | | | |
|---|---|---|---|
| 8,942,434 B1* | 1/2015 | Karakotsios | G06K 9/00597 345/619 |
| 2003/0012425 A1* | 1/2003 | Suzuki | G02B 27/0093 382/154 |
| 2003/0098954 A1* | 5/2003 | Amir | A61B 3/113 351/210 |
| 2010/0110374 A1* | 5/2010 | Raguin | A61B 3/1216 351/206 |
| 2011/0141010 A1* | 6/2011 | Sakata | A61B 3/113 345/156 |
| 2015/0104081 A1* | 4/2015 | Ionita | G06K 9/4614 382/117 |
| 2015/0338915 A1* | 11/2015 | Publicover | G06F 21/64 345/633 |
| 2016/0019410 A1* | 1/2016 | Komogortsev | A61B 5/1171 382/117 |
| 2016/0232399 A1* | 8/2016 | Kempinski | G06K 9/0061 |
| 2017/0193213 A1* | 7/2017 | Tsou | G06F 21/32 |
| 2017/0193285 A1* | 7/2017 | Negi | G06K 9/00288 |
| 2019/0019047 A1* | 1/2019 | Zhou | G06F 3/013 |

FOREIGN PATENT DOCUMENTS

| | | | |
|---|---|---|---|
| CN | 101710383 | 5/2010 | |
| CN | 102749991 | 10/2012 | |
| CN | 102842040 | 12/2012 | |
| CN | 104166835 | 11/2014 | |
| JP | WO2008007781 A1 * | 1/2008 | G01B 11/26 |
| KR | 20110102073 | 9/2011 | |

OTHER PUBLICATIONS

Liu, Hantao, and Ingrid Heynderickx. Studying the added value of visual attention in objective image quality metrics based on eye movement data. 2009 16th IEEE international conference on image processing (ICIP). IEEE, 2009 (Year: 2009).*

Cohn, Jeffrey F., et al. Multimodal coordination of facial action, head rotation, and eye motion during spontaneous smiles. Sixth IEEE International Conference on Automatic Face and Gesture Recognition, 2004. Proceedings. (Year: 2004).*

First Chinese Office Action, issued in the corresponding Chinese patent application No. 201510543516.5, dated Apr. 23, 2018, 16 pages.

Second Chinese Office Action, issued in the corresponding Chinese patent application No. 201510543516.5, dated Sep. 13, 2018, 27 pages.

Zhongming et al.,"A measure of the distance between continuous numerical variables", Data analysis and R, Aug. 31, 2014, 17 pages.

Dongping Xu, "The Stimulation Modeling of Tracking and Collision in 3-D", Wuhan Transportation Science and Technology University, Aug. 31, 2014, 17 pages.

Third Chinese Office Action, issued in the corresponding Chinese patent application No. 201510543516.5, dated Apr. 30, 2019, 17 pages.

* cited by examiner

LIVENESS DETECTION METHOD, LIVENESS DETECTION SYSTEM, AND LIVENESS DETECTION DEVICE

CROSS-REFERENCE TO RELATED APPLICATION

The present application claims the priority of Chinese patent application No. 201510543516.5 filed on Aug. 28, 2015, the disclosure of which is incorporated herein by reference in its entirety.

TECHNICAL FIELD

The present disclosure relates to the field of liveness detection, and more particularly, to a liveness detection method capable of implementing liveness detection on a human body, and a liveness detection system that employs the liveness detection method.

BACKGROUND

At present, face recognition systems are more and more frequently applied to scenarios that require an ID authentication in fields like security, finance etc., such as remote bank account opening system, access control system, remote transaction operating verification system, etc. In these application fields with high security level, in addition to ensuring that a face similarity of a person to be verified matches with library data stored in a database, first of all, it needs that the person to be verified is a legitimate biological living body. That is to say, the face recognition system needs to be able to prevent an attacker from attacking using pictures, 3D face models, or masks and so on.

The method for solving the above problem is usually called liveness detection, which aims to determine whether an obtained biological feature comes from a living, in-field, real person. Mature liveness verification schemes has not existed among technology products on market yet, conventional liveness detection techniques either depend on specific hardware devices (such as infrared camera, depth camera) or can prevent only simple attacks from static pictures. In addition, most of the liveness detection systems existing in the prior art are cooperated-style, i.e., requiring a person being tested to make a corresponding action or stay still in place for a period of time according to an instruction from the systems, however it affects user's experience and efficiency of liveness detection. Besides, for example, accuracy and robustness of another method for determining whether there is an image border in a detected image can hardly meet the actual demands.

SUMMARY

In view of the above problem, the present disclosure is proposed. The present disclosure provides a liveness detection method capable of implementing liveness detection on a human body, and a liveness detection system that employs the liveness detection method, wherein liveness detection is performed by utilizing human eyes gazing at an object on a screen consciously or unconsciously. Therefore, lower cooperation is required from the user, and accuracy of the face recognition systems, usability, and user's experience are all improved.

According to an embodiment of the present disclosure, there is provided a liveness detection method, comprising: obtaining video data acquired via a video acquisition module; determining, based on the video data, a feature signal of an object to be detected; judging whether the feature signal meets a first predetermined condition, and if the feature signal meets the first predetermined condition, identifying that the object to be detected is a living body, wherein the feature signal is indicative of eye movement of the object to be detected.

In addition, in the liveness detection method according to an embodiment of the present disclosure, further comprising: prior to obtaining video data acquired via a video acquisition module, prompting displaying of a predetermined content; and displaying the predetermined content, wherein the predetermined content includes a target whose position changes.

In addition, in the liveness detection method according to an embodiment of the present disclosure, wherein determining, based on the video data, a feature signal of an object to be detected comprises: determining, based on the video data, a face image contained therein as the object to be detected; extracting position information of canthus and pupil in the face image; determining, based on the position information of canthus and pupil, a relative position sequence of the pupil in a time period of displaying the predetermined content; and determining a correlation coefficient between the relative position sequence of the pupil and a position sequence of the target whose position changes as the feature signal.

In addition, in the liveness detection method according to an embodiment of the present disclosure, wherein judging whether the feature signal meets a first predetermined condition, and if the feature signal meets the first predetermined condition, identifying that the object to be detected is a living body comprises: judging whether the correlation coefficient is greater than a first predetermined threshold, and if the correlation coefficient is greater than the first predetermined threshold, identifying that the object to be detected is a living body.

In addition, in the liveness detection method according to an embodiment of the present disclosure, wherein determining, based on the video data, a feature signal of an object to be detected comprises: determining, based on the video data, a face image contained therein as the object to be detected; extracting position information of canthus and pupil in the face image; determining, based on the position information of canthus and pupil, a relative position sequence of the pupil; and determining a relative position variance of the pupil as the feature signal.

In addition, in the liveness detection method according to an embodiment of the present disclosure, wherein judging whether the feature signal meets a first predetermined condition, and if the feature signal meets the first predetermined condition, identifying that the object to be detected is a living body comprises: judging whether the relative position variance is greater than a second predetermined threshold, and if the relative position variance is greater than the second predetermined threshold, identifying that the object to be detected is a living body.

In addition, in the liveness detection method according to an embodiment of the present disclosure, wherein determining, based on the video data, a feature signal of an object to be detected comprises: training in advance to obtain corresponding relationship of a trained eye image in trained video data and an eye gaze direction sequence; determining, based on the video data, a face image contained therein as the object to be detected; extracting an eye image to be detected in the face image; determining, based on the corresponding relationship and the eye image to be detected, an eye gaze direction sequence corresponding to the video data as the feature signal.

In addition, in the liveness detection method according to an embodiment of the present disclosure, wherein judging whether the feature signal meets a first predetermined condition, and if the feature signal meets the first predetermined condition, identifying that the object to be detected is a living body comprises: judging whether the eye gaze direction sequence corresponding to the video data corresponds to a position change sequence of a target whose position changes, and if the eye gaze direction sequence corresponds to the position change sequence of the target whose position changes, identifying that the object to be detected is a living body.

In addition, in the liveness detection method according to an embodiment of the present disclosure, wherein judging whether the feature signal meets a first predetermined condition, and if the feature signal meets the first predetermined condition, identifying that the object to be detected is a living body comprises: judging whether a variation of the eye gaze direction sequence is greater than a third predetermined threshold, and if the variation of the eye gaze direction sequence is greater than a third predetermined threshold, identifying that the object to be detected is a living body.

According to another embodiment of the present disclosure, there is provided a liveness detection system, comprising: a video acquisition module for acquiring video data; a liveness detection module for performing, based on the video data, liveness detection, and including: a feature signal determination unit for determining, based on the video data, a feature signal of an object to be detected; a feature signal judgment unit for judging whether the feature signal meets a first predetermined condition, and if the feature signal meets the first predetermined condition, identifying that the object to be detected is a living body, wherein the feature signal is indicative of eye movement of the object to be detected.

In addition, in the liveness detection system according to another embodiment of the present disclosure, further comprising: a display module for displaying a predetermined content, wherein prior to the video acquisition module acquires video data, the liveness detection module prompts displaying of the predetermined content, and wherein the predetermined content includes a target whose position changes.

In addition, in the liveness detection system according to another embodiment of the present disclosure, wherein the feature signal determination unit determines, based on the video data, a face image contained therein as the object to be detected; extracts position information of canthus and pupil in the face image; determines, based on the position information of canthus and pupil, a relative position sequence of the pupil in a time period of displaying the predetermined content; and determines a correlation coefficient between the relative position sequence of the pupil and a position sequence of the target whose position changes as the feature signal.

In addition, in the liveness detection system according to another embodiment of the present disclosure, wherein the feature signal judgment unit judges whether the correlation coefficient is greater than a first predetermined threshold, and if the correlation coefficient is greater than the first predetermined threshold, identifies that the object to be detected is a living body.

In addition, in the liveness detection system according to another embodiment of the present disclosure, wherein the feature signal determination unit determines, based on the video data, a face image contained therein as the object to be detected; extracts position information of canthus and pupil in the face image; determines, based on the position information of canthus and pupil, a relative position sequence of the pupil; and determines a relative position variance of the pupil as the feature signal.

In addition, in the liveness detection system according to another embodiment of the present disclosure, wherein the feature signal judgment unit judges whether the relative position variance is greater than a second predetermined threshold, and if the relative position variance is greater than the second predetermined threshold, identifies that the object to be detected is a living body.

In addition, in the liveness detection system according to another embodiment of the present disclosure, wherein the liveness detection module trains in advance to obtain corresponding relationship between a trained eye image in trained video data and an eye gaze direction sequence; the feature signal determination unit determines, based on the video data, a face image contained therein as the object to be detected; extracts an eye image to be detected in the face image; determines, based on the corresponding relationship and the eye image to be detected, an eye gaze direction sequence corresponding to the video data as the feature signal In addition, in the liveness detection system according to another embodiment of the present disclosure, wherein the feature signal judgment unit judges whether the eye gaze direction sequence corresponding to the video data corresponds to a position change sequence of a target whose position changes, and if the eye gaze direction sequence corresponds to the position change sequence of the target whose position changes, identifies that the object to be detected is a living body.

In addition, in the liveness detection system according to another embodiment of the present disclosure, wherein the feature signal judgment unit judges whether a variation of the eye gaze direction sequence corresponding to the video is greater than a third predetermined threshold, and if the variation of the eye gaze direction sequence is greater than a third predetermined threshold, identifies that the object to be detected is a living body.

According to yet another embodiment of the present disclosure, there is provided a computer program product, comprising a computer-readable medium on which computer program instructions are stored, wherein the computer program instructions, when run by a computer, cause the computer to execute the following steps: obtaining video data acquired via a video acquisition module; determining, based on the video data, a feature signal of an object to be detected; judging whether the feature signal meets a first predetermined condition, and if the feature signal meets the first predetermined condition, identifying that the object to be detected is a living body, wherein the feature signal is indicative of eye movement of the object to be detected.

It is to be understood that both the foregoing general descriptions and the following detailed descriptions are exemplary and intended to provide further explanations of the claimed technique.

BRIEF DESCRIPTION OF THE DRAWINGS

Through the more detailed description of embodiments of the present disclosure with reference to the accompanying drawings, the above and other objectives, features, and advantages of the present disclosure will become more apparent. The drawings are to provide further understanding for the embodiments of the present disclosure and constitute a portion of the specification, and are intended to interpret the present disclosure together with the embodiments rather than to limit the present disclosure. In the drawings, the same reference sign generally refers to the same component or step.

DETAILED DESCRIPTION OF THE EMBODIMENTS

To make the objectives, technical solutions, and advantages of the present disclosure more clear, exemplary embodiments of the present disclosure will be described in detail with reference to the accompanying drawings. Obviously, the described embodiments merely are only part of the embodiments of the present disclosure, rather than all of the embodiments of the present disclosure, it should be understood that the present disclosure is not limited to the exemplary embodiments described herein. All other embodiments obtained by those skilled in the art without paying inventive efforts should all fall into the protection scope of the present disclosure.

Hereinafter, preferred embodiments of the present disclosure will be described in detail with reference to the accompanying drawings.

Figure 1:
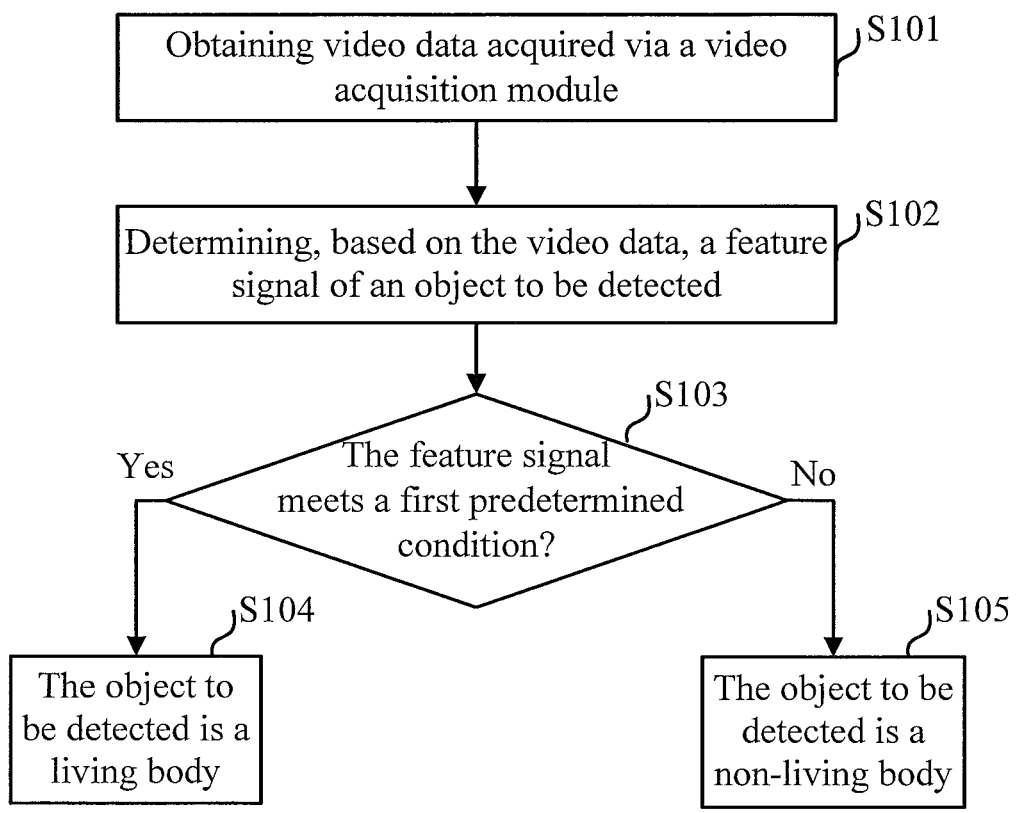
FIG. 1 is a flowchart briefly illustrating the liveness detection method according to an embodiment of the present disclosure.

FIG. 1 is a flowchart briefly illustrating the liveness detection method according to an embodiment of the present disclosure. As shown in FIG. 1, the liveness detection method according to an embodiment of the present disclosure comprises the following steps.

In step S101, obtaining video data acquired via a video acquisition module. In an embodiment of the present disclosure, the video acquisition module is a camera (such as RGB camera or depth camera) capable of acquiring video data of an object being shot. Obtaining video data acquired by a video acquisition module comprises, but not limited to, after video data is acquired by the video acquisition module that is physically separated from the liveness detection system, video data transmitted from the video acquisition module is received in a wired or wireless manner. Alternatively, the video acquisition module may be physically located on the same position or even within the same housing together with other modules or components of the liveness detection system, the other modules or components in the liveness detection system receive the video data transmitted by the video acquisition module via an internal bus.

As it will be described in detail below, in an embodiment of the present disclosure, the video data acquired by the video acquisition module may be acquired while the user gazes at a predetermined content being displayed, the predetermined content includes a target whose position changes, and the video data may be a segment of video with a continuous predetermined time period (e.g., 3 seconds). A face which serves as an object to be detected needs to clearly appear in the video. Preferably, the size of the video image is no less than 64×64 pixels. In another embodiment of the present disclosure, the video data acquired by the video acquisition module may also be a video acquired by the video acquisition module during a normal operation process period (such as, click a menu) of the user without displaying the predetermined content, that is, in the case of not necessarily prompting the user of start of the liveness detection process. Thereafter, the processing proceeds to step S102.

In step S102, determining, based on the video data, a feature signal of an object to be detected. In an embodiment of the present disclosure, the feature signal is indicative of eye movement of the object to be detected. For example, in the case of acquiring the video data while the user gazes at the predetermined content being displayed, if the object to be detected is a living body, his/her eyes move along with position change of a target. Alternatively, in the case of not displaying the predetermined content, when the video data is a video acquired by the video acquisition module during a normal operation process period of the user, if the object to be detected is a living body, his/her eyes move during the normal operation process. As it will be described in detail below, the video data is processed via a trained convolution neural network (CNN) or the like, to extract the feature signal. Thereafter, the processing proceeds to step S103.

In step S103, judging whether the feature signal meets a first predetermined condition. As it will be described in detail below, the first predetermined condition may be that the feature signal indicates whether eye movement of the object to be detected conforms to position change of the target in the predetermined content being displayed, or indicates a notability degree of the eye movement of the object to be detected.

If a positive result is obtained in step S103, that is, the feature signal meets the first predetermined condition, it indicates that eye movement of the object to be detected conforms to position change of the target in the predetermined content or that there is a notable eye movement of the object to be detected, then the processing proceeds to step S104. In step 104, identifying the object to be detected as a living body.

Contrarily, if a negative result is obtained in step S103, then the processing proceeds to step S105. In step 105, identifying the object to be detected as a non-living body.

The liveness detection method according to an embodiment of the present disclosure as described above can perform liveness detection by utilizing human eyes gazing at an object on a screen consciously or unconsciously, and thereby effectively differentiate a normal user from a picture, a video, or a mask and so on used by an attacker, and no specific cooperation is required from the user, and security and usability of the liveness detection system are improved.

Hereinafter, a liveness detection system that executes the liveness detection method will be further described with reference to FIG. 2.

Figure 2:
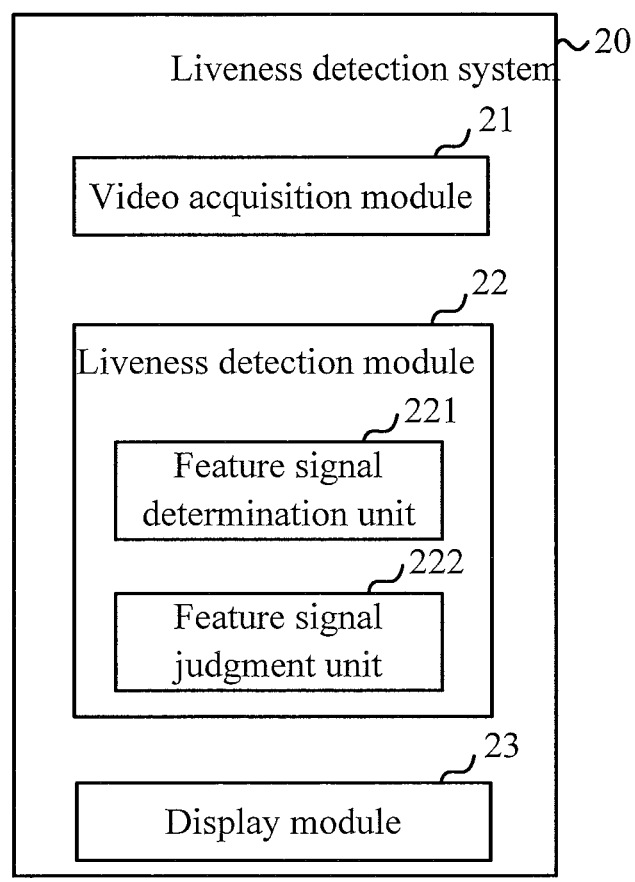
FIG. 2 is a functional block diagram illustrating the liveness detection system according to an embodiment of the present disclosure.

FIG. 2 is a functional block diagram illustrating the liveness detection system according to an embodiment of the present disclosure. As shown in FIG. 2, the liveness detection system 20 according to an embodiment of the present disclosure comprises a video acquisition module 21, a liveness detection module 22, and a display module 23. The liveness detection module 22 further includes a feature signal determination unit 221 and a feature signal judgment unit 222. The video acquisition module 21, the liveness detection module 22, and the display module 23 together with the feature signal determination unit 221 and the feature signal judgment unit 222 included in the liveness detection module 22 may for example be configured with hardware (server, dedicated computer, etc.), software, firmware, and any possible combination thereof.

Specifically, the video acquisition module 21 is configured to obtain video data. In an embodiment of the present disclosure, the video acquisition module 21 may be a video acquisition device of a RGB camera capable of acquiring video data of an object being shot. In another embodiment of the present disclosure, the video acquisition module 21 may include a depth camera (depth vidicon) capable of acquiring depth information of an object being shot. The video acquisition module 21 may be physically separated from the liveness detection module 22, or may be physically located on the same position or within the same housing together with the liveness detection module 22. In the case where the video acquisition module 21 is physically separated from the liveness detection module 22, the video acquisition module 21 further transmits, in a wired or wireless manner, depth video data acquired by the video acquisition device to the module. In the case where the video acquisition module 21 is physically located on the same position or within the same housing together with the liveness detection module 22, the video acquisition module 21 further transmits, via an internal bus, depth video data acquired by the video acquisition device to the liveness detection module 22. The video data may be RGB chromatic video data or RGBD video data including depth information. Prior to transmitting the video data in a wired or wireless manner or via a bus, the video data can be encoded with a predetermined format and compressed as a video packet, so as to reduce traffic and bandwidth that are required by the transmission.

As described above, the video data acquired by the video acquisition module 21 may be acquired while the user gazes at a predetermined content being displayed, the predetermined content includes a target whose position changes, and the video data may be a segment of video with a continuous predetermined time period (e.g., 3 seconds). A face which serves as an object to be detected needs to clearly appear in the video. Preferably, the size of the video image is no less than 64×64 pixels. In another embodiment of the present disclosure, the video data acquired by the video acquisition module 21 may also be a video acquired by the video acquisition module during a normal operation process period (such as, click a menu) of the user without displaying the predetermined content, that is, in the case of not necessarily prompting the user of start of the liveness detection process.

The liveness detection module 22 is for performing, based on the video data, liveness detection. Specifically, the feature signal determination unit 221 is for determining, based on the video data, a feature signal of an object to be detected; and the feature signal judgment unit 222 is for judging whether the feature signal meets a first predetermined condition, and if the feature signal meets the first predetermined condition, identifying that the object to be detected is a living body. Exemplarily, the liveness detection module 22 may be implemented by hardware such as a processor, may also be implemented by a computer and software run therein.

The display module 23 is for displaying a predetermined content. In an embodiment of the present disclosure, prior to the video acquisition module 21 acquires video data, the liveness detection module 22 prompts displaying of the predetermined content, the predetermined content includes a target whose position changes. The feature signal determination unit 221 determines, based on the video data, a face image contained therein as the object to be detected; extracts position information of canthus and pupil in the face image; determines, based on the position information of canthus and pupil, a relative position sequence of the pupil in a time period of displaying the predetermined content; and determines a correlation coefficient between the relative position sequence of the pupil and a position sequence of the target whose position changes as the feature signal. The feature signal judgment unit 222 judges whether the correlation coefficient is greater than a first predetermined threshold, and if the correlation coefficient is greater than the first predetermined threshold, identifies that the object to be detected is a living body.

In another embodiment of the present disclosure, the liveness detection system according to an embodiment of the present application may not include the display module 23 for displaying a predetermined content, that is, the video data is acquired by the video acquisition module 21 during a normal operation process period (such as, click a menu) of the user without necessarily prompting the user of start of the liveness detection process by the liveness detection module 22. In this case, the feature signal determination unit 221 determines, based on the video data, a face image contained therein as the object to be detected; extracts position information of canthus and pupil in the face image; determines, based on the position information of canthus and pupil, a relative position sequence of the pupil; and determines a relative position variance of the pupil as the feature signal. The feature signal judgment unit 222 judges whether the relative position variance is greater than a second predetermined threshold, and if the relative position variance is greater than the second predetermined threshold, identifies that the object to be detected is a living body.

In another embodiment of the present disclosure, the liveness detection module 22 trains in advance to obtain corresponding relationship between a trained eye image in trained video data and an eye gaze direction sequence. The feature signal determination unit 221 determines, based on the video data, a face image contained therein as the object to be detected; extracts an eye image to be detected in the face image; determines, based on the corresponding relationship and the eye image to be detected, an eye gaze direction sequence corresponding to the video data as the feature signal. In one example of this embodiment, the feature signal judgment unit 222 judges whether the eye gaze direction sequence corresponding to the video corresponds to the position change sequence of the target whose position changes, if the eye gaze direction sequence corresponds to the position change sequence of the target whose position changes, then identifies that the object to be detected is a living body. In another example of this embodiment, the feature signal judgment unit 222 judges whether a variation of the eye gaze direction sequence corresponding to the video is greater than a third predetermined threshold, if the variation of the eye gaze direction sequence is greater than a third predetermined threshold, then identifies that the object to be detected is a living body.

Figure 3:
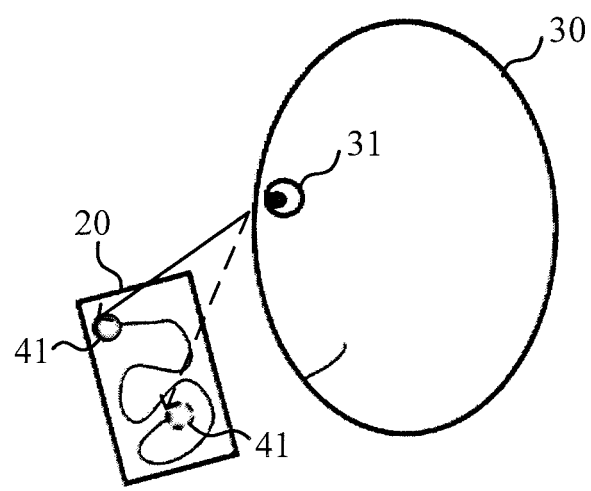
FIG. 3 is a schematic block diagram schematically illustrating the liveness detection process according to an embodiment of the present disclosure.

FIG. 3 is a schematic block diagram schematically illustrating the liveness detection process according to an embodiment of the present disclosure. As shown in FIG. 3, the liveness detection system 20 is for performing liveness recognition on an object 30 to be detected. In an embodiment of the present disclosure, the liveness detection system 20 prompts the object 30 to be detected about displaying of a predetermined content 41, the predetermined content 41 is for example a little ball with a trajectory generated randomly. During a time period of displaying the predetermined content 41, the liveness detection system 20 acquires an image of the object 30 to be detected. If the object 30 to be detected is a living body, then his/her eyes 31 move along with position change of a target (e.g., a little ball) in the predetermined content 41. In another embodiment of the present disclosure, the liveness detection system 20 may, without displaying the predetermined content 41, acquire a video during a normal operation process period of the user, if the object 30 to be detected is a living body, his/her eyes 31 also move during the normal operation process.

In the above, the liveness detection method and the liveness detection system according to the embodiments of the present disclosure have been briefed with reference to FIGS. 1 to 3. Next, the liveness detection method according to first to third embodiments of the present disclosure will be further described in detail below with reference to FIGS. 4 to 7.

Figure 4:
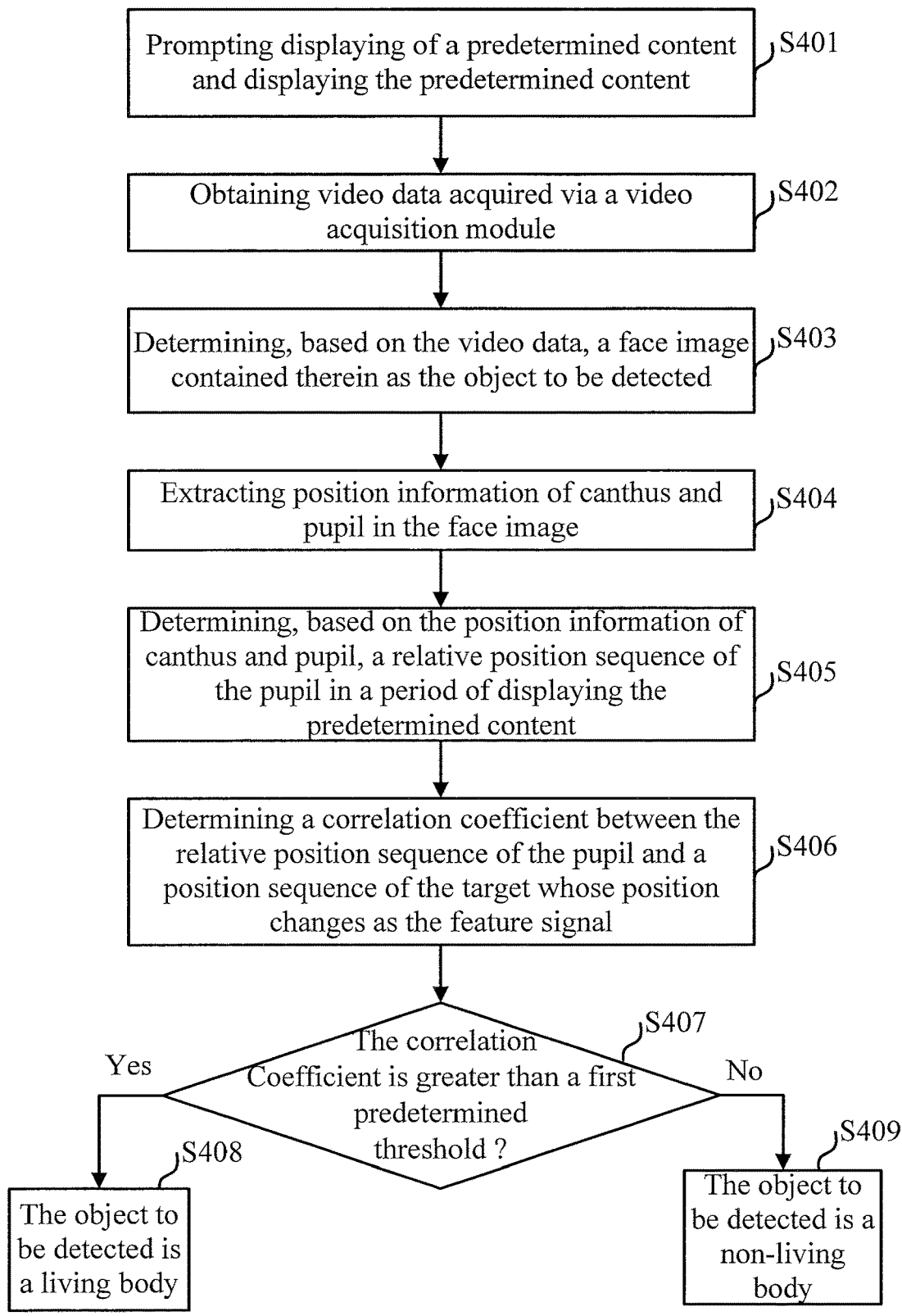
FIG. 4 is a flowchart further illustrating the liveness detection method according to a first embodiment of the present disclosure.

FIG. 4 is a flowchart further illustrating the liveness detection method according to a first embodiment of the present disclosure. As shown in FIG. 4, the liveness detection method according to the first embodiment of the present disclosure comprises the following steps.

In step S401, prompting displaying of a predetermined content; and displaying the predetermined content. In the first embodiment of the present disclosure, prompting text or pattern is displayed on the display module 23 of the liveness detection system 20, to guide the user to gaze at the display module 23. Thereafter, a predetermined content including a target whose position changes is displayed on the display module 23. For example, as described above with reference to FIG. 3, the predetermined content includes a target of a little ball with a trajectory generated randomly. Hereinafter, position of the target at time i is represented by a position sequence $(X_i, Y_i)$ generated randomly. The position sequence may be a continuous curve generated randomly, or alternatively, the position sequence may appear randomly in each moment and hops among four corners of the screen.

In step S402, obtaining video data acquired via a video acquisition module. In the first embodiment of the present disclosure, while displaying the predetermined content, the video acquisition module of the liveness detection system 20 acquires video data of that the object to be detected gazing at the predetermined content. The video data may be a segment of video with a continuous predetermined time period (e.g., 3 seconds). A face which serves as the object to be detected needs to clearly appear in the video. Preferably, the size of the video image is no less than 64×64 pixels. Thereafter, the processing proceeds to step S403.

In step S403, determining, based on the video data, a face image contained therein as the object to be detected. In the first embodiment of the present disclosure, the liveness detection module 22 of the liveness detection system 20 determines a face image contained in the video data as the object to be detected. For example, the liveness detection module 22 may obtain, in the video data, a position of the face in the video image by using a face detector (such as Adaboost Cascade) that is trained in advance. Thereafter, the processing proceeds to step S404.

In step S404, extracting position information of canthus and pupil in the face image. In the first embodiment of the present disclosure, the liveness detection module 22 of the liveness detection system 20 extracts the position information of canthus and pupil in the face image. For example, the liveness detection module 22 may use a trained convolution neural network regression to obtain a position of each critical point (e.g., canthus and pupil) in a detected face image.

Specifically, as for the left eye, $(Px_i, Py_i)$ is set as pupil position output by the face detector, $(Lx_i, Ly_i)$ and $(Rx_i, Ry_i)$ respectively are positions of the two canthi of the left eye as output by the face detector, it is made that $d=\sqrt{(Lx_i-Rx_i)^2+(Ly_i-Ry_i)^2}$, the relative position of the pupil of the left eye calculated by using the following Equations (1) and (2) is $(Ax^L_i, Ay^L_i)$:

$$(Ax^L_i = (Px_i \times (Rx_i - Lx_i) + Py_i \times (Ry_i - Ly_i))/d^2 \quad \text{Equation (1)}$$

$$Ay^L_i = (-Px_i \times (Ry_i - Ly_i) + Py_i \times (Rx_i - Lx_1))/d^2 \quad \text{Equation (2)}$$

Likewise, for the right eye, the relative position $(Ax^R_i, Ay^R_i)$ of the pupil of the right eye is calculated. Thereafter, the processing proceeds to step S405.

In step S405, determining, based on the position information of canthus and pupil, a relative position sequence of the pupil in a time period of displaying the predetermined content. Specifically, an average of the relative positions of the pupils of the two eyes is calculated by using the following Equations (3) and (4) as the relative position sequence of the pupil:

$$Ax_i = (Ax^L_i + Ax^R_i)/2 \quad \text{Equation (3)}$$

$$Ay_i = (Ay^L_i + Ay^R_i)/2 \quad \text{Equation (4)}$$

Thereafter, the processing proceeds to step S406.

In step S406, determining a correlation coefficient between the relative position sequence of the pupil and a position sequence of the target whose position changes as the feature signal. Specifically, the correlation coefficient between the position sequence of the target in the predetermined content and the position sequence of the pupil is calculated by using the following Equations (5) and (6).

The correlation coefficient between X and Ax is calculated $$C_x = \frac{\sum_{i=1}^{T}(X_i - \overline{X})(Ax_i - \overline{AX_i})}{\sqrt{\left(\sum_{i=1}^{T}(X_i - \overline{X})^2\right)\left(\sum_{i=1}^{T}(Ax_i - \overline{Ax})^2\right)}} \quad \text{Equation (5)}$$

where T is a total number of frames acquired, $$\overline{X} = \frac{1}{T}\sum_{i=1}^{T} X_i, \quad \overline{Ax} = \frac{1}{T}\sum_{i=1}^{T} Ax_i.$$

The correlation coefficient between Y and Ay is calculated $$C_y = \frac{\sum_{i=1}^{T}(Y_i - \overline{Y})(Ay_i - \overline{AY_i})}{\sqrt{\left(\sum_{i=1}^{T}(Y_i - \overline{Y})^2\right)\left(\sum_{i=1}^{T}(Ay_i - \overline{Ay})^2\right)}} \quad \text{Equation (6)}$$

where T is a total number of frames acquired, $$\overline{Y} = \frac{1}{T}\sum_{i=1}^{T} Y_i, \quad \overline{Ay} = \frac{1}{T}\sum_{i=1}^{T} Ay_i.$$

Thereafter, the processing proceeds to step S407.

In step S407, judging whether the correlation coefficient is greater than a first predetermined threshold. Specifically, calculating the correlation coefficient by using the Equation (7) as the feature signal which indicates the eye movement of the object to be detected:

$$c = c_x + c_y \qquad \text{Equation (7)}$$

the first predetermined threshold is set in advance by training.

If a positive result is obtained in step S407, i.e., the correlation coefficient is greater than the first predetermined threshold, then the processing proceeds to step S408. In step S408, identifying that the object to be detected is a living body. Specifically, if the correlation coefficient is greater than the first predetermined threshold, it indicates that the position change of the two pupils of the two eyes as determined from the video data of the object to be detected is closely related to the position sequence of the target whose position changes, that is, position change of the pupils changes along with the position change of the target, which is a property that the object as a living-body has.

Contrarily, if a negative result is obtained in step S407, that is, the correlation coefficient is not greater than the first predetermined threshold, then the processing proceeds to step S409. In step S409, determining the object to be detected as a non-living body. Specifically, if the correlation coefficient is not greater than the first predetermined threshold, it indicates that the position of pupils does not change closely related to the position sequence of the target whose position changes in the video data of the object to be detected, that is, the object to be detected does not have the property that the position of pupils changes along with the position change of the target.

The liveness detection method according to the first embodiment of the present disclosure has been described above with reference to FIG. 4, the method can effectively differentiate a video playback, a picture, and a face of a living body by using the property that the eyes of human being change along with the position change of the content on the screen and thereby eyeball movement (position of the pupils) is generated as the feature signal. Meanwhile, the liveness detection method according to the first embodiment of the present disclosure does not require the user to make a specific action or expression, cooperation difficulty is reduced, and good user's experience is achieved.

Figure 5:
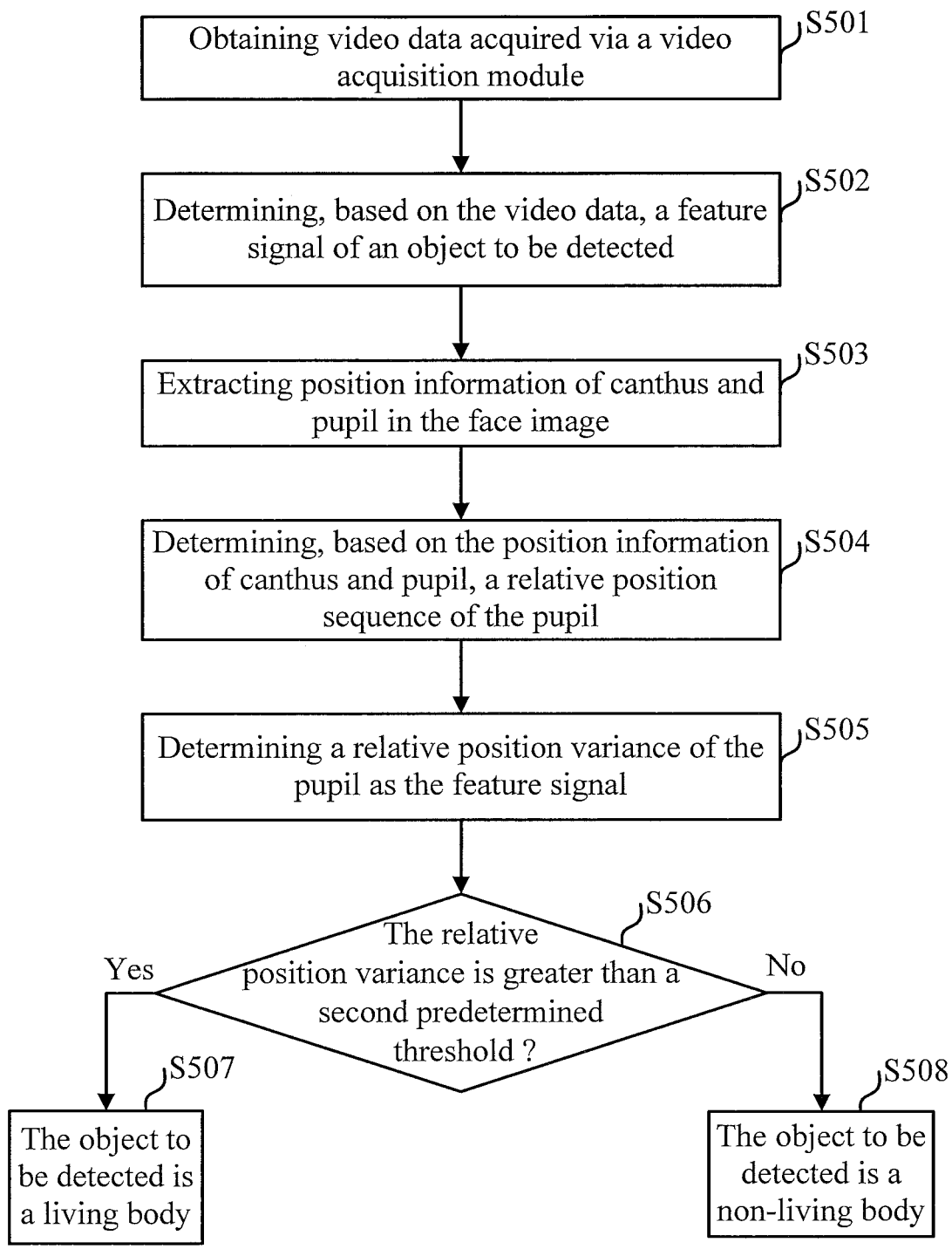
FIG. 5 is a flowchart further illustrating the liveness detection method according to a second embodiment of the present disclosure.

FIG. 5 is a flowchart further illustrating the liveness detection method according to a second embodiment of the present disclosure. As shown in FIG. 5, the liveness detection method according to the second embodiment of the present disclosure comprises the following steps.

In step S501, obtaining video data acquired via a video acquisition module. The liveness detection method according to the second embodiment of the present disclosure does not include the step of prompting displaying of a predetermined content and displaying the predetermined content as contained in the liveness detection method according to the first embodiment of the present disclosure. The video data acquired by the video acquisition module 21 is a video acquired by the video acquisition module 21 during a normal operation process period (such as, click a menu) of the user without displaying the predetermined content, that is, in the case of not necessarily prompting the user of start of the liveness detection process by the liveness detection module 22. Thereafter, the processing proceeds to step S502.

In step S502, determining, based on the video data, a feature signal of an object to be detected. Like step S403 in FIG. 4, in the second embodiment of the present disclosure, the liveness detection module 22 of the liveness detection system 20 determines a face image contained in the video data as the object to be detected. For example, the liveness detection module 22 may obtain, in the video data, a position of the face in the video image by using a face detector (such as Adaboost Cascade) that is trained in advance. Thereafter, the processing proceeds to step S503.

In step S503, extracting position information of canthus and pupil in the face image. Like step S404 in FIG. 4, in the second embodiment of the present disclosure, the liveness detection module 22 of the liveness detection system 20 extracts the position information of canthus and pupil in the face image. For example, the liveness detection module 22 may use a trained convolution neural network regression to obtain a position of each critical point in a detected face image.

Thereafter, the processing proceeds to step S504.

In step S504, determining, based on the position information of canthus and pupil, a relative position sequence of the pupil. In the second embodiment of the present disclosure, specifically, the relative position $(Ax^L_i, Ay^L_i)$ of the pupil of the left eye and the relative position $(Ax^R_i, Ay^R_i)$ of the pupil of the right eye are calculated by using Equations (1) and (2). Then an average of the relative positions of the pupils of the two eyes is calculated by using the above Equations (3) and (4) as the relative position sequence of the pupil. Thereafter, the processing proceeds to step S505.

In step S505, determining a relative position variance of the pupil as the feature signal indicative of eye movement of the object to be detected. In the second embodiment of the present disclosure, specifically, the relative position variance of the pupil is calculated by using Equations (8) and (9):

$$Sx = \frac{1}{T}\sum_{i=1}^{T}(Ax_i - \overline{Ax})^2 \qquad \text{Equation (8)}$$

$$Sy = \frac{1}{T}\sum_{i=1}^{T}(Ay_i - \overline{Ay})^2 \qquad \text{Equation (9)}$$

Thereafter, the processing proceeds to step S506.

In step S506, judging whether the relative position variance is greater than a second predetermined threshold. Specifically, the relative position variance is calculated by using Equation (10):

$$S = S_x + S_y \qquad \text{Equation (10)}$$

wherein the second predetermined threshold is set in advance by training.

If a positive result is obtained in step S506, i.e., the relative position variance is greater than the second predetermined threshold, then the processing proceeds to step S507. In step S507, identifying that the object to be detected is a living body. Specifically, if the relative position variance is greater than the second predetermined threshold, it indicates that the positions of pupils of the two eyes as determined from the video data of the object to be detected have an obvious change, which may probably appear during a normal operation period of the object to be detected, or even be merely a normal biological movement of eyes of a living person within a certain period of time, and this is a property that the object as a living-body has.

Contrarily, if a negative result is obtained in step S506, that is, the relative position variance is not greater than the second predetermined threshold, then the processing proceeds to step S508. In step S508, determining the object to be detected as a non-living body. Specifically, if the relative position variance not is greater than the second predetermined threshold, it indicates that there is no obvious position change of pupils in the video data of the object to be detected, that is, the object to be detected does not have a living body's property of having a normnal biological movement of eyes within a certain period of time.

The liveness detection method according to the second embodiment of the present disclosure has been described above with reference to FIG. 5, the method needs not to display a specific sequence of content or prompt the user to gaze at content on the screen, which has better concealment. As for a attacker using pictures to initiate an attack, because the relative positions of pupils of the eyes remain unchanged, the method according to this embodiment can determined that the picture used by the attacker is not a living body.

Figure 6:
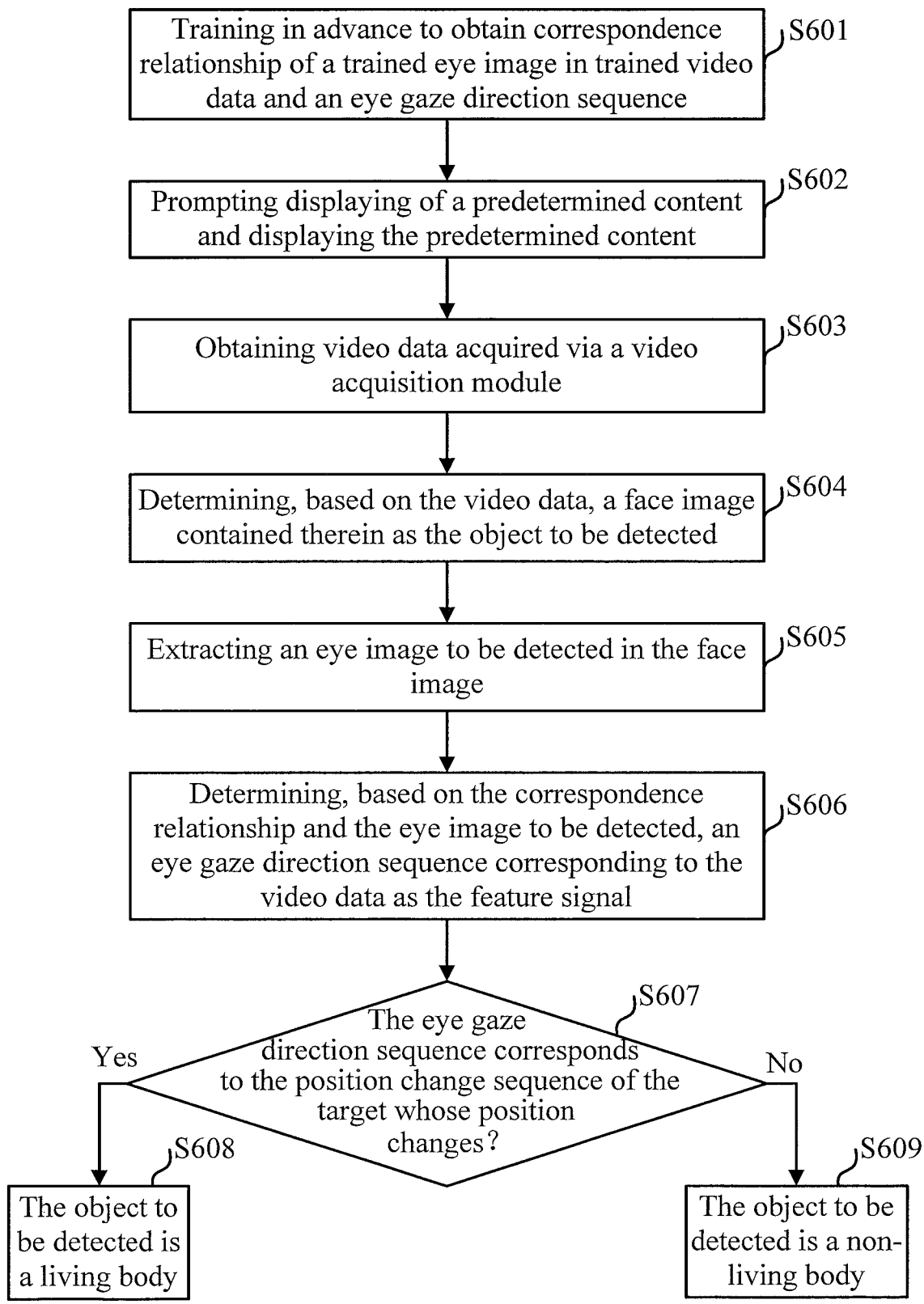
FIG. 6 is a flowchart further illustrating the liveness detection method according to a first example of a third embodiment of the present disclosure.

FIG. 6 is a flowchart further illustrating the liveness detection method according to a first example of a third embodiment of the present disclosure. Different than the manner that the liveness detection module 22 performs image processing on each frame of image in the video in the first and second embodiments of the present disclosure described above with reference to FIGS. 4 and 5, in the liveness detection method according to the third embodiment of the present disclosure, the liveness detection module 22 considers information of all frames of the whole video, that is, considering chronological sequence relationship between the respective frames, and time length with which an action lasts. Specifically, the liveness detection method according to the first example of the third embodiment of the present disclosure comprises the following steps.

In step S601, training in advance to obtain corresponding relationship of a trained eye image in trained video data and an eye gaze direction sequence. In the liveness detection method according to the third embodiment of the present disclosure, during a training process, for example, four directions of up, down, left, and right may be divided. When acquiring the trained video data, a video of a moving point that randomly moves up, down, left, and right is generated, the object being acquired is required to gaze at this moving point. For example, this moving point moves from upper left to upper right, then lower right, and then upper right, and a sequence of this moving point is marked as "right-down-up". The video of the object gazing at this moving point is inputted into the liveness detection module 22 (such as RNN), the liveness detection module 22 is required to output a sequence of "right-down-up". After a large amount of training by using the video and the corresponding sequence output, the liveness detection module 22 can output a sequence of movement direction according to a video. Thereafter, the processing proceeds to step S602.

Steps S602 to S604 are the same as steps S401 to S403 in FIG. 4, respectively, therefore, no more details are repeated here.

At the time of displaying a predetermined content, the liveness detection module 22 of the liveness detection system 20 extracts an eye image to be detected in the face image in step S605, after the video acquisition module 21 of the liveness detection system 20 acquires a video of that the object to be detected gazing at displaying of the predetermined content. Thereafter, the processing proceeds to step S606.

In step S606, determining, based on the corresponding relationship and the eye image to be detected, an eye gaze direction sequence corresponding to the video data as the feature signal which is indicative of eye movement of the object. In the liveness detection method according to the third embodiment of the present disclosure, based on the corresponding relationship of the trained eye image in trained video data and the eye gaze direction sequence as obtained in step S601 described above, the liveness detection module 22 outputs an eye gaze direction sequence corresponding to the video data as the feature signal. Thereafter, the processing proceeds to step S607.

In step S607, judging whether the eye gaze direction sequence corresponding to the video corresponds to the position change sequence of the target whose position changes.

If a positive result is obtained in step S607, that is, the eye gaze direction sequence corresponding to the video corresponds to the position change sequence of the target whose position changes, then the processing proceeds to step S608. In step S608, identifying that the object to be detected is a living body. That is to say, if the eye gaze direction sequence output by the liveness detection module 22 corresponds to the position change sequence of the target whose position changes, it indicates that the eyes change along with the position change of the target in the video data of the object to be detected, which is a property that the object as a living-body has.

Contrarily, if a negative result is obtained in step S607, that is, the eye gaze direction sequence corresponding to the video does not correspond to the position change sequence of the target whose position changes, then the processing proceeds to step S609. In step S609, determining the object to be detected as a non-living body. Specifically, if the eye gaze direction sequence corresponding to the video output by the liveness detection module 22 does not correspond to the position change sequence of the target whose position changes, it indicates that the object to be detected does not have a living body' property of eyes changing along with the position change of the target.

The liveness detection method according to the first example of the third embodiment of the present disclosure has been described above with reference to FIG. 6, the method can effectively differentiate a video playback, a picture, and a face of a living body, by using the property that the eyes of human being change along with the change of position of the content on the screen and thereby eyeball movement is generated.

Figure 7:
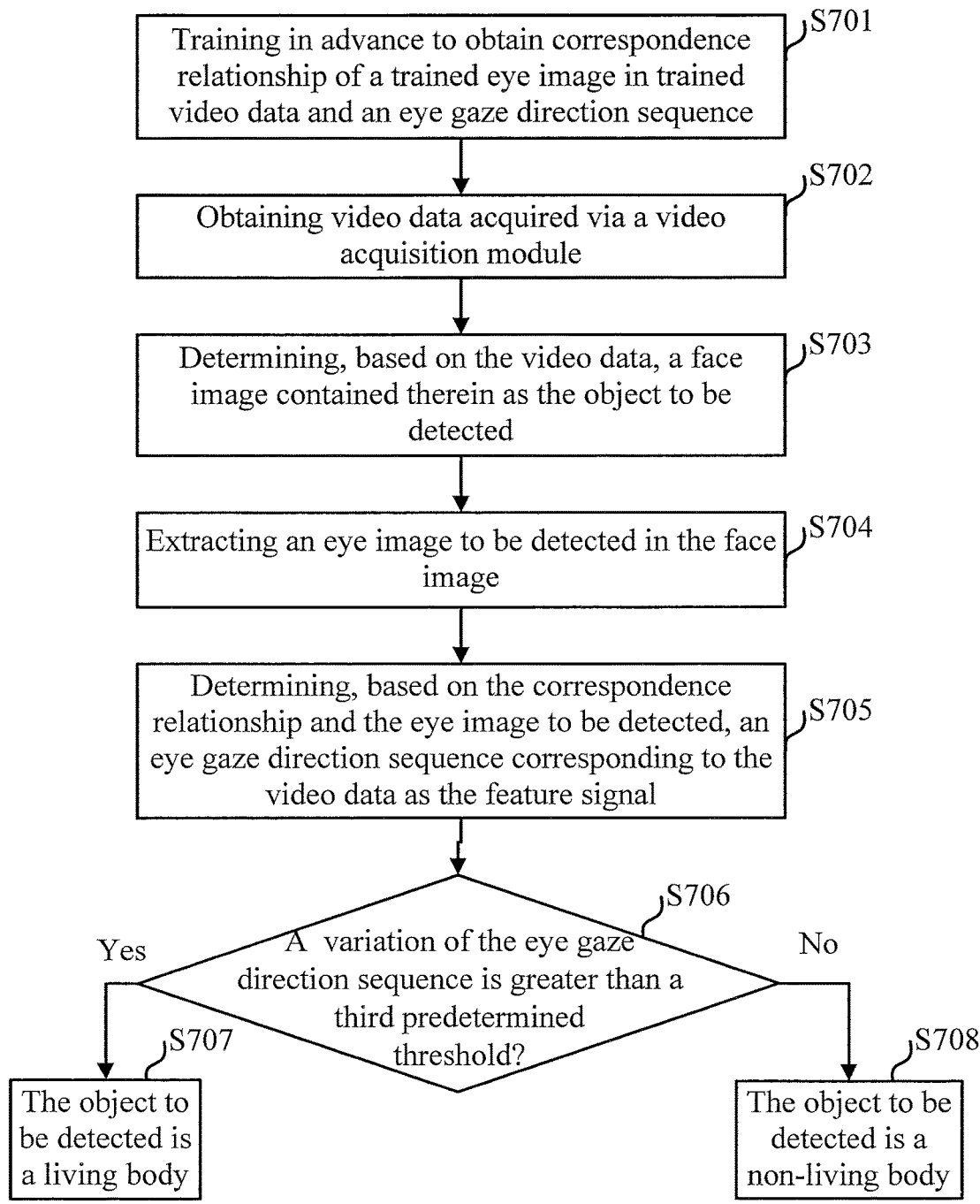
FIG. 7 is a flowchart further illustrating the liveness detection method according to a second example of a third embodiment of the present disclosure.

FIG. 7 is a flowchart further illustrating the liveness detection method according to a second example of a third embodiment of the present disclosure. Step S701 shown in FIG. 7 is the same as S601 shown in FIG. 6, also is, after a large amount of training using the video and the corresponding sequence output, obtaining corresponding relationship of a trained eye image in trained video data and an eye gaze direction sequence. Thereafter, different than the liveness detection method according to the first example of the third embodiment of the present disclosure as shown in FIG. 6, the liveness detection method according to the second example of the third embodiment of the present disclosure as shown in FIG. 7 may not include the step of prompting displaying of a predetermined content and displaying the predetermined content. In the liveness detection method according to the second example of the third embodiment of the present disclosure as shown in FIG. 7, the video acquisition module 21 acquires a video during a normal operation process period (such as, click a menu) of the user in step S702, the liveness detection module 22 determines a face image contained in the video data as the object to be detected in step S703 and extracts an eye image to be detected in the face image in step S704, and the liveness detection module 22 further determines an eye gaze direction sequence corresponding to the video data as the feature signal which is indicative of eye movement of the object based on the corresponding relationship and the eye image to be detected in step S705. Thereafter, the processing proceeds to step S706.

In step S706, judging whether a variation of the eye gaze direction sequence corresponding to the video is greater than a third predetermined threshold. In one embodiment, the variation of the eye gaze direction sequence can be the feature signal indicative of the eye movement of the object to be detected.

If a positive result is obtained in step S706, that is, the variation of the eye gaze direction sequence is greater than a third predetermined threshold, then the processing proceeds to step S707. In step S707, identifying that the object to be detected is a living body. Specifically, if the variation of the eye gaze direction sequence is greater than a third predetermined threshold, it indicates that the eyes gaze direction obviously changes in the video data of the object to be detected, which may probably appear during a normal operation period of the object to be detected, or even merely be a normal biological movement of eyes of a living person within a certain period of time, which is a property that the object as a living-body has.

Contrarily, if a negative result is obtained in step S706, that is, the variation of the eye gaze direction sequence is not greater than a third predetermined threshold, then the processing proceeds to step S708. In step S708, determining the object to be detected as a non-living body. Specifically, if the variation of the eye gaze direction sequence is not greater than a third predetermined threshold, it indicates that there is no obvious change of gaze direction of the eyes in the video data of the object to be detected, that is, the object to be detected does not have a living body' property of having a normal biological movement of eyes within a certain period of time.

The liveness detection method according to the second example of the third embodiment of the present disclosure has been described above with reference to FIG. 7, the method needs not to display a specific sequence of content or prompt the user to gaze at content on the screen, which has better concealment. The method can effectively differentiate a video playback, a picture, and a face of a living body, by judging whether the object to be detected has a living body's property of having a normal biological movement of eyes within a certain period of time.

Figure 8:
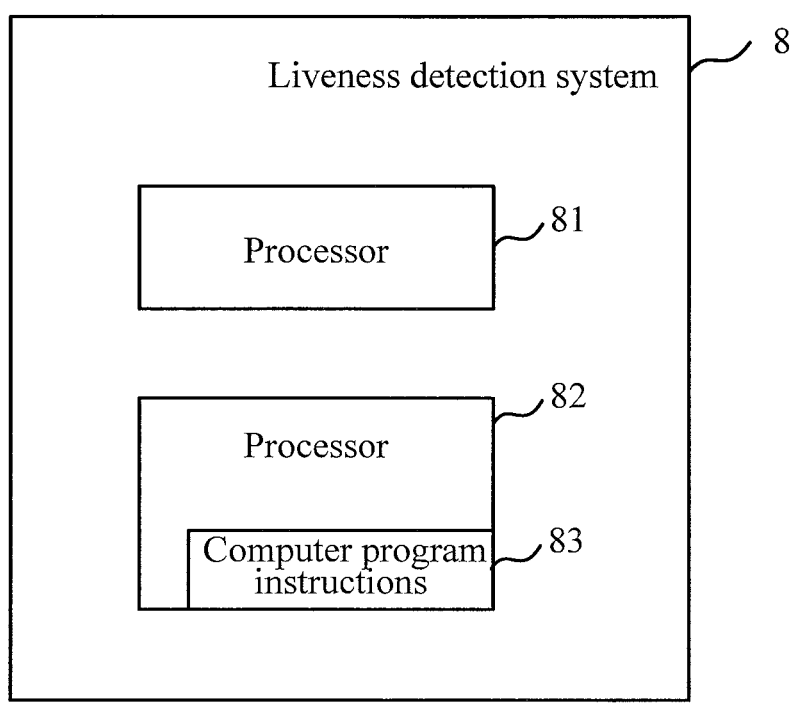
FIG. 8 is a schematic block diagram illustrating the liveness detection system according to an embodiment of the present disclosure.

FIG. 8 is a schematic block diagram illustrating the liveness detection system according to an embodiment of the present disclosure. As shown in FIG. 8, the liveness detection system 8 according to the embodiment of the present disclosure comprises: a processor 81, a memory 82, and computer program instructions 83 stored in the memory 82.

The computer program instructions 83 when run by the processor 81 can cause the liveness detection system 8 to achieve functions of respective functional modules of the liveness detection system according to an embodiment of the present disclosure and/or execute respective steps of the liveness detection method according to an embodiment of the present disclosure.

Specifically, the computer program instructions 83 when run by the processor 81 can cause the liveness detection system 8 to perform the steps of: obtaining video data acquired via a video acquisition module; determining, based on the video data, a feature signal of an object to be detected; judging whether the feature signal meets a first predetermined condition, and if the feature signal meets the first predetermined condition, identifying that the object to be detected is a living body, wherein the feature signal is indicative of eye movement of the object to be detected.

In addition, the computer program instructions 83 when run by the processor 81 further causes the liveness detection system 8 to perform the steps of: prior to obtaining video data acquired via a video acquisition module, prompting displaying of a predetermined content, and displaying of the predetermined content, and wherein the predetermined content includes a target whose position changes.

In addition, the step of determining, based on the video data, a feature signal of an object to be detected performed by the liveness detection system 8 caused by the computer program instructions 83 run by the processor 81 comprises: determining, based on the video data, a face image contained therein as the object to be detected; extracting position information of canthus and pupil in the face image; determining, based on the position information of canthus and pupil, a relative position sequence of the pupil in a time period of displaying the predetermined content; and determining a correlation coefficient between the relative position sequence of the pupil and a position sequence of the target whose position changes as the feature signal.

In addition, the step of judging whether the feature signal meets a first predetermined condition, and if the feature signal meets the first predetermined condition, identifying that the object to be detected is a living body executed by the liveness detection system 8 caused by the computer program instructions 83 run by the processor 81 comprises: judging whether the correlation coefficient is greater than a first predetermined threshold, if the correlation coefficient is greater than the first predetermined threshold, then identifying that the object to be detected is a living body.

In addition, the step of determining, based on the video data, a feature signal of an object to be detected executed by the liveness detection system 8 caused by the computer program instructions 83 run by the processor 81 comprises: determining, based on the video data, a face image contained therein as the object to be detected; extracting position information of canthus and pupil in the face image; determining, based on the position information of canthus and pupil, a relative position sequence of the pupil; and determining a relative position variance of the pupil as the feature signal.

In addition, the step of judging whether the feature signal meets a first predetermined condition, and if the feature signal meets the first predetermined condition, identifying that the object to be detected is a living body executed by the liveness detection system 8 caused by the computer program instructions 83 run by the processor 81 comprises: judging whether the relative position variance is greater than a second predetermined threshold, if the relative position variance is greater than the second predetermined threshold, then identifying that the object to be detected is a living body.

In addition, the step of determining, based on the video data, a feature signal of an object to be detected executed by the liveness detection system 8 caused by the computer program instructions 83 by run the processor 81 comprises: training in advance to obtain corresponding relationship of a trained eye image in trained video data and an eye gaze direction sequence; determining, based on the video data, a face image contained therein as the object to be detected; extracting an eye image to be detected in the face image; determining, based on the corresponding relationship and the eye image to be detected, an eye gaze direction sequence corresponding to the video data as the feature signal.

In addition, the step of judging whether the feature signal meets a first predetermined condition, and if the feature signal meets the first predetermined condition, identifying that the object to be detected is a living body executed by the liveness detection system 8 caused by the computer program instructions 83 run by the processor 81 comprises: judging whether the eye gaze direction sequence corresponding to the video data corresponds to a position change sequence of a target whose position changes, if the eye gaze direction sequence corresponds to the position change sequence of the target whose position changes, then identifying that the object to be detected is a living body.

In addition, the step of judging whether the feature signal meets a first predetermined condition, and if the feature signal meets the first predetermined condition, identifying that the object to be detected is a living body executed by the liveness detection system 8 caused by the computer program instructions 83 run by the processor 81 comprises: judging whether a variation of the eye gaze direction sequence corresponding to the video is greater than a third predetermined threshold, if the variation of the eye gaze direction sequence corresponding to the video is greater than a third predetermined threshold, then identifying that the object to be detected is a living body.

Respective modules in the liveness detection system according to an embodiment of the present disclosure may be implemented by that the processor in the liveness detection system according to an embodiment of the present disclosure run the computer program instructions stored in the memory, or may be implemented by that the computer program instructions stored in the computer-readable storage medium of the computer program product according to an embodiment of the present disclosure are run by a computer.

The computer-readable storage medium may be any combination of one or more computer-readable storage mediums, e.g., a computer-readable storage medium containing computer-readable program codes for determining a feature signal of an object to be detected, and another computer-readable storage medium containing computer-readable program codes for determining if the feature signal meets a first predetermined conditions.

The computer-readable storage medium may for example include a memory card of a smart phone, a storage unit of a tablet computer, a hard disk of a personal computer, a random access memory (RAM), a read only memory (ROM), an erasable programmable read-only memory (EPROM), a portable compact disc read-only memory (CD-ROM), a USB memory, or a combination of any the aforesaid storage mediums.

Exemplary embodiments of the present disclosure as described in detail above are merely illustrative, rather than limitative. However, those skilled in the art should understand that, various modifications, combinations or sub-combinations may be made to these embodiments without departing from the principles and spirits of the present disclosure, and such modifications are intended to fall within the scope of the present disclosure.

What is claimed is:

1. A liveness detection method, comprising:
prompting displaying of a predetermined content and displaying the predetermined content including a target whose position changes;
obtaining video data acquired via a video acquisition module;
determining, based on the video data, a feature signal of an object to be detected;
judging whether the feature signal meets a first predetermined condition, and in response to the feature signal meeting the first predetermined condition, identifying that the object to be detected is a living body,
wherein the feature signal is indicative of eye movement of the object to be detected, and the first predetermined condition is indicative of whether eye movement of the object to be detected conforms to position change of the target in the predetermined content being displayed,
wherein determining, based on the video data, a feature signal of an object to be detected comprises:
determining, based on the video data, a face image contained therein as the object to be detected;
extracting position information of canthus and pupil in the face image;
determining, based on the position information of canthus and pupil, a relative position sequence of the pupil in a time period of displaying the predetermined content; and
determining a correlation coefficient between the relative position sequence of the pupil and a position sequence of the target whose position changes as the feature signal,
wherein the video data is a video of the object which is acquired while the predetermined content is displayed,
wherein the relative position sequence of the pupil is represented as $(Ax_i, Ay_i)$, $Ax_i$ and $Ay_i$ are an average of the relative positions of the pupils of the two eyes respectively, and the position sequence of the target is represented as $(X_i, Y_i)$,
the correlation coefficient $c_x$ between X and Ax is calculated as $$c_x = \frac{\sum_{i=1}^{T}(X_i - \overline{X})(Ax_i - \overline{AX_i})}{\sqrt{\left(\sum_{i=1}^{T}(X_i - \overline{X})^2\right)\left(\sum_{i=1}^{T}(Ax_i - \overline{Ax})^2\right)}}$$

where T is a total number of frames acquired, $\overline{X} = 1/T \Sigma_{i=1}^{T} X_i$, $\overline{Ax} = 1/T \Sigma_{i=1}^{T} Ax_i$,
the correlation coefficient $c_y$ between Y and Ay is calculated as $$c_y = \frac{\sum_{i=1}^{T}(Y_i - \overline{Y})(Ay_i - \overline{AY_i})}{\sqrt{\left(\sum_{i=1}^{T}(Y_i - \overline{Y})^2\right)\left(\sum_{i=1}^{T}(Ay_i - \overline{Ay})^2\right)}}$$

where T is a total number of frames acquired, $\overline{Y} = 1/T \Sigma_{i=1}^{T} Y_i$, $\overline{Ay} = 1/T \Sigma_{i=1}^{T} Ay_i$,
the feature signal is represented as $c = c_x + c_y$.

2. The liveness detection method as claimed in claim 1, wherein judging whether the feature signal meets a first predetermined condition, and in response to the feature signal meeting the first predetermined condition, identifying that the object to be detected is a living body comprises:
judging whether the correlation coefficient is greater than a first predetermined threshold, in response to the correlation coefficient being greater than the first predetermined threshold, then identifying that the object to be detected is a living body.

3. The liveness detection method as claimed in claim 1, wherein determining, based on the video data, a feature signal of an object to be detected comprises:
  training in advance to obtain corresponding relationship of a trained eye image in trained video data and an eye gaze direction sequence;
  determining, based on the video data, a face image contained therein as the object to be detected;
  extracting an eye image to be detected in the face image;
  determining, based on the corresponding relationship and the eye image to be detected, an eye gaze direction sequence corresponding to the video data as the feature signal.

4. The liveness detection method as claimed in claim 3, wherein judging whether the feature signal meets a first predetermined condition, and in response to the feature signal meeting the first predetermined condition, identifying that the object to be detected is a living body comprises:
  judging whether the eye gaze direction sequence corresponding to the video data corresponds to a position change sequence of the target whose position changes, in response to the eye gaze direction sequence corresponding to the position change sequence of the target whose position changes, then identifying that the object to be detected is a living body.

5. A liveness detection system, comprising:
  a display module for displaying a predetermined content including a target whose position changes;
  a video acquisition module for acquiring video data;
  a liveness detection module for performing, based on the video data, liveness detection, and including:
    a feature signal determination unit for determining, based on the video data, a feature signal of an object to be detected;
    a feature signal judgment unit for judging whether the feature signal meets a first predetermined condition, and in response to the feature signal meeting the first predetermined condition, identifying that the object to be detected is a living body,
  wherein prior to the video acquisition module acquires video data, the liveness detection module prompts displaying of the predetermined content,
  wherein the feature signal is indicative of eye movement of the object to be detected, and the first predetermined condition is indicative of whether eye movement of the object to be detected conforms to position change of the target in the predetermined content being displayed,
  wherein the feature signal determination unit determines, based on the video data, a face image contained therein as the object to be detected; extracts position information of canthus and pupil in the face image; determines, based on the position information of canthus and pupil, a relative position sequence of the pupil in a time period of displaying the predetermined content; and determines a correlation coefficient between the relative position sequence of the pupil and a position sequence of the target whose position changes as the feature signal,
  wherein the video data is a video of the object which is acquired by the video acquisition module while the predetermined content is displayed by the display module,
  wherein the relative position sequence of the pupil is represented as $(Ax_i, Ay_i)$, $Ax_i$ and $Ay_i$ are an average of the relative positions of the pupils of the two eyes respectively, and the position sequence of the target is represented as $(Xi, Yi)$, the correlation coefficient $c_x$ between X and Ax is calculated as $$c_x = \frac{\sum_{i=1}^{T}(X_i - \overline{X})(Ax_i - \overline{AX_i})}{\sqrt{\left(\sum_{i=1}^{T}(X_i - \overline{X})^2\right)\left(\sum_{i=1}^{T}(Ax_i - \overline{Ax})^2\right)}}$$

where T is a total number of frames acquired, $\overline{X} = 1/T\Sigma_{i=1}^{T} X_i$, $\overline{Ax}=1/T \Sigma_{i=1}^{T}Ax_i$, the correlation coefficient $c_y$ between Y and Ay is calculated as $$c_y = \frac{\sum_{i=1}^{T}(Y_i - \overline{Y})(Ay_i - \overline{AY_i})}{\sqrt{\left(\sum_{i=1}^{T}(Y_i - \overline{Y})^2\right)\left(\sum_{i=1}^{T}(Ay_i - \overline{Ay})^2\right)}}$$

where T is a total number of frames acquired, $\overline{Y} = 1/T\Sigma_{i=1}^{T} Y_i$, $\overline{Ay}=1/T \Sigma_{i=1}^{T}Ay_i$, the feature signal is represented as $c=c_x+c_y$.

6. The liveness detection system as claimed in claim 5, wherein the feature signal judgment unit judges whether the correlation coefficient is greater than a first predetermined threshold, in response to the correlation coefficient being greater than the first predetermined threshold, then identifies that the object to be detected is a living body.

7. The liveness detection system as claimed in claim 5, wherein the liveness detection module trains in advance to obtain corresponding relationship between a trained eye image in trained video data and an eye gaze direction sequence;
  the feature signal determination unit determines, based on the video data, a face image contained therein as the object to be detected; extracts an eye image to be detected in the face image; determines, based on the corresponding relationship and the eye image to be detected, an eye gaze direction sequence corresponding to the video data as the feature signal.

8. The liveness detection system as claimed in claim 7, wherein the feature signal judgment unit judges whether the eye gaze direction sequence corresponding to the video data corresponds to a position change sequence of the target whose position changes, in response to the eye gaze direction sequence corresponding to the position change sequence of the target whose position changes, then identifies that the object to be detected is a living body.

9. A liveness detection device, comprising:
  a processor;
  a memory; and
  computer program instructions stored in the memory and when run by the processor, configured to cause the liveness detection device to perform a liveness detection method comprising the following steps:
  prompting displaying of a predetermined content and displaying the predetermined content including a target whose position changes;
  obtaining video data acquired via a video acquisition module;
  determining, based on the video data, a feature signal of an object to be detected;

judging whether the feature signal meets a first predetermined condition, and in response to the feature signal meeting the first predetermined condition, identifying that the object to be detected is a living body, wherein the feature signal is indicative of eye movement of the object to be detected, and the first predetermined condition is indicative of whether eye movement of the object to be detected conforms to position change of the target in the predetermined content being displayed, wherein the step of determining, based on the video data, a feature signal of an object to be detected performed by the liveness detection device caused by the computer program instructions run by the processor comprises:

determining, based on the video data, a face image contained therein as the object to be detected;

extracting position information of canthus and pupil in the face image;

determining, based on the position information of canthus and pupil, a relative position sequence of the pupil in a time period of displaying the predetermined content; and determining a correlation coefficient between the relative position sequence of the pupil and a position sequence of the target whose position changes as the feature signal, wherein the video data is a video of the object which is acquired while the predetermined content is displayed, wherein the relative position sequence of the pupil is represented as $(Ax_i, Ay_i)$, $Ax_i$ and $Ay_i$ are an average of the relative positions of the pupils of the two eyes respectively, and the position sequence of the target is represented as $(Xi, Yi)$, the correlation coefficient $c_x$ between X and Ax is calculated as $$c_x = \frac{\sum_{i=1}^{T}(X_i - \overline{X})(Ax_i - \overline{AX_i})}{\sqrt{\left(\sum_{i=1}^{T}(X_i - \overline{X})^2\right)\left(\sum_{i=1}^{T}(Ax_i - \overline{Ax})^2\right)}}$$

where T is a total number of frames acquired, $\overline{X}= 1/T\Sigma_{i=1}^{T} X_i$, $\overline{Ax}=1/T \Sigma_{i=1}^{T}Ax_i$, the correlation coefficient $c_y$ between Y and Ay is calculated as $$c_y = \frac{\sum_{i=1}^{T}(Y_i - \overline{Y})(Ay_i - \overline{AY_i})}{\sqrt{\left(\sum_{i=1}^{T}(Y_i - \overline{Y})^2\right)\left(\sum_{i=1}^{T}(Ay_i - \overline{Ay})^2\right)}}$$

where T is a total number of frames acquired, $\overline{Y}= 1/T\Sigma_{i=1}^{T} Y_i$, $\overline{Ay}=1/T \Sigma_{i=1}^{T}Ay_i$, the feature signal is represented as $c=c_x+c_y$.

10. The liveness detection device as claimed in claim 9, wherein the step of judging whether the feature signal meets a first predetermined condition, and in response to the feature signal meeting the first predetermined condition, identifying that the object to be detected is a living body performed by the liveness detection device caused by the computer program instructions run by the processor comprises:

judging whether the correlation coefficient is greater than a first predetermined threshold, in response to the correlation coefficient being greater than the first predetermined threshold, then identifying that the object to be detected is a living body.

11. The liveness detection device as claimed in claim 9, wherein the step of determining, based on the video data, a feature signal of an object to be detected performed by the liveness detection device caused by the computer program instructions run by the processor comprises:

training in advance to obtain corresponding relationship of a trained eye image in trained video data and an eye gaze direction sequence;

determining, based on the video data, a face image contained therein as the object to be detected;

extracting an eye image to be detected in the face image;

determining, based on the corresponding relationship and, the eye image to be detected, an eye gaze direction sequence corresponding to the video data as the feature signal.

12. The liveness detection device as claimed in claim 11, wherein the step of judging whether the feature signal meets a first predetermined condition, and in response to the feature signal meeting the first predetermined condition, identifying that the object to be detected is a living body performed by the liveness detection device caused by the computer program instructions run by the processor comprises:

judging whether the eye gaze direction sequence corresponding to the video data corresponds to a position change sequence of the target whose position changes, in response to the eye gaze direction sequence corresponding to the position change sequence of the target whose position changes, then identifying that the object to be detected is a living body.

* * * * *